Nov. 7, 1967 A. B. NIEMOLLER 3,351,705

ISOLATED PHASE BUS STRUCTURE

Filed Oct. 29, 1964 5 Sheets-Sheet 1

Nov. 7, 1967 A. B. NIEMOLLER 3,351,705

ISOLATED PHASE BUS STRUCTURE

Filed Oct. 29, 1964 5 Sheets-Sheet 2

Nov. 7, 1967 A. B. NIEMOLLER 3,351,705

ISOLATED PHASE BUS STRUCTURE

Filed Oct. 29, 1964

5 Sheets-Sheet 3

3,351,705

ISOLATED PHASE BUS STRUCTURE

Arthur B. Niemoller, Monroeville, Pa., assignor to Westinghouse Electric Corporation, Pittsburgh, Pa., a corporation of Pennsylvania Filed Oct. 29, 1964, Ser. No. 407,347
7 Claims. (Cl. 174—99)

This invention relates to bus structures and, more particularly, to bus structures of the isolated phase or segregated phase type.

In conventional isolated phase bus equipment, it has been the practice to mount the insulators which support each phase conductor within the associated housing on supporting means which extend through the housing to be secured to and supported by crossbeams of an external supporting structure which may also include continuous, longitudinally extending, supporting members. This type of construction requires that each phase of the equipment include a telescoping housing section, a removable housing section or some other means to permit the assembly of certain insulators with the associated phase conductor or to permit the inspection or maintenance of the insulators or phase conductors after the equipment is placed in operation. It has been found that the above construction does not lend itself to certain types of isolated phase bus equipment, particularly those having relatively high current ratings in which it is desirable that the successive housing sections which surround each phase conductor be electrically continuous to improve magnetic shielding around each phase conductor and in which it is desirable that the successive housing sections which surround each phase conductor be relatively permanently joined together. It is therefore desirable that an improved isolated phase structure be provided including an improved means for supporting the bus conductors within the associated housings and for externally supporting the housings of a three-phase isolated phase bus equipment and which lends itself to an electrically and structurally continuous construction, as just mentioned.

It is an object of this invention to provide a new and improved bus structure.

Another object of this invention is to provide an improved means for supporting a bus conductor in an isolated or segregated phase bus structure.

A further object of this invention is to provide an improved means for permitting access to the insulating supports disposed within each housing of an isolated or segregated phase bus structure.

A still further object of this invention is to provide an improved isolated phase bus structure in which the external means for supporting the housing or housings of the structure may be located independently of the location of the insulating supports for the bus conductors disposed within the associated housings.

Other objects of the invention will, in part, be obvious and will, in part, appear hereinafter.

For a fuller understanding of the nature and objects of the invention, reference should be had to the following detailed description, taken in conjunction with the accompanying drawings, in which.

Figure 1:
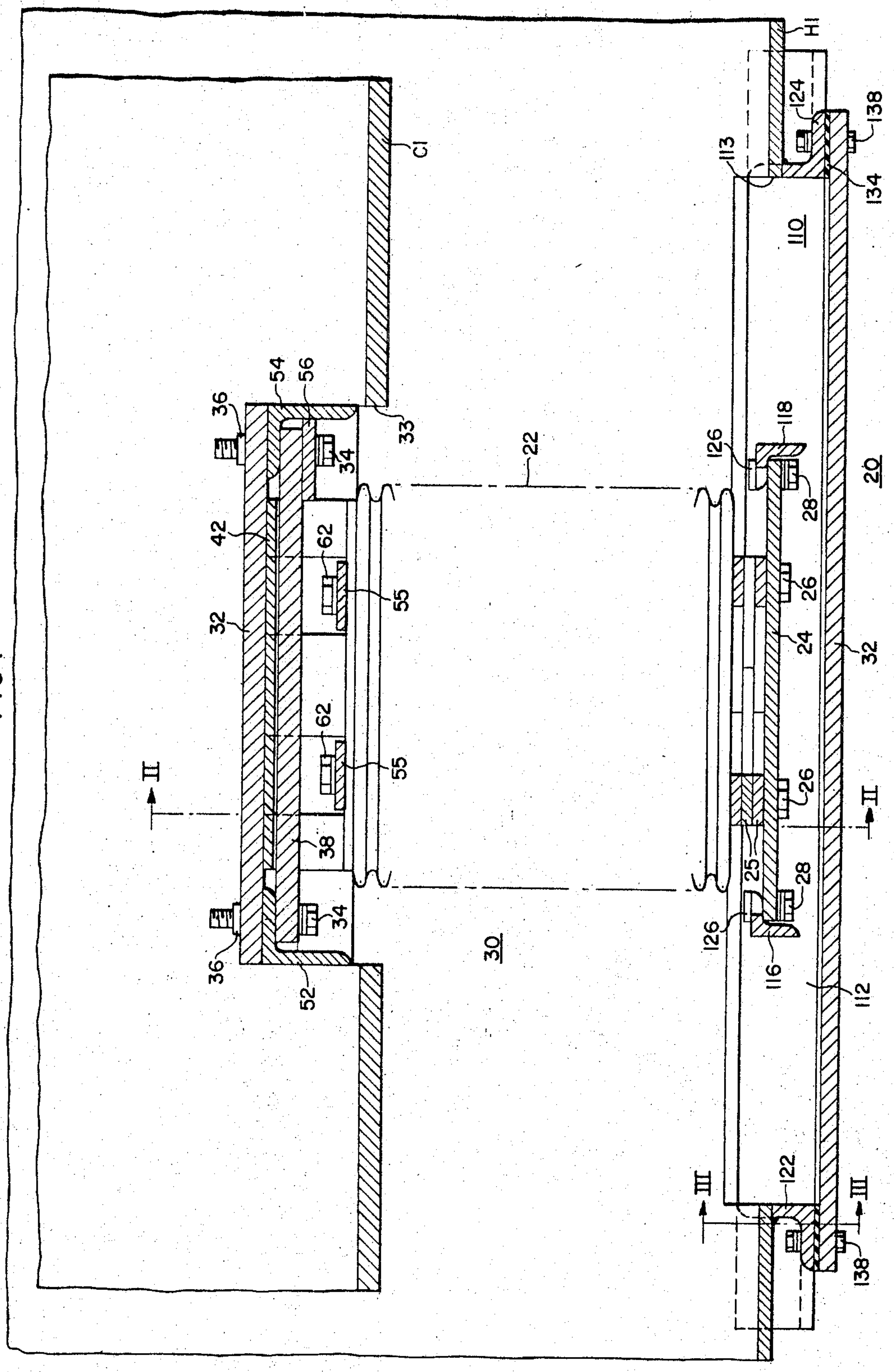
FIGURE 1 is a view, partly in side elevation and partly in section, of an isolated phase bus structure embodying the principal features of the invention.
Figure 2:
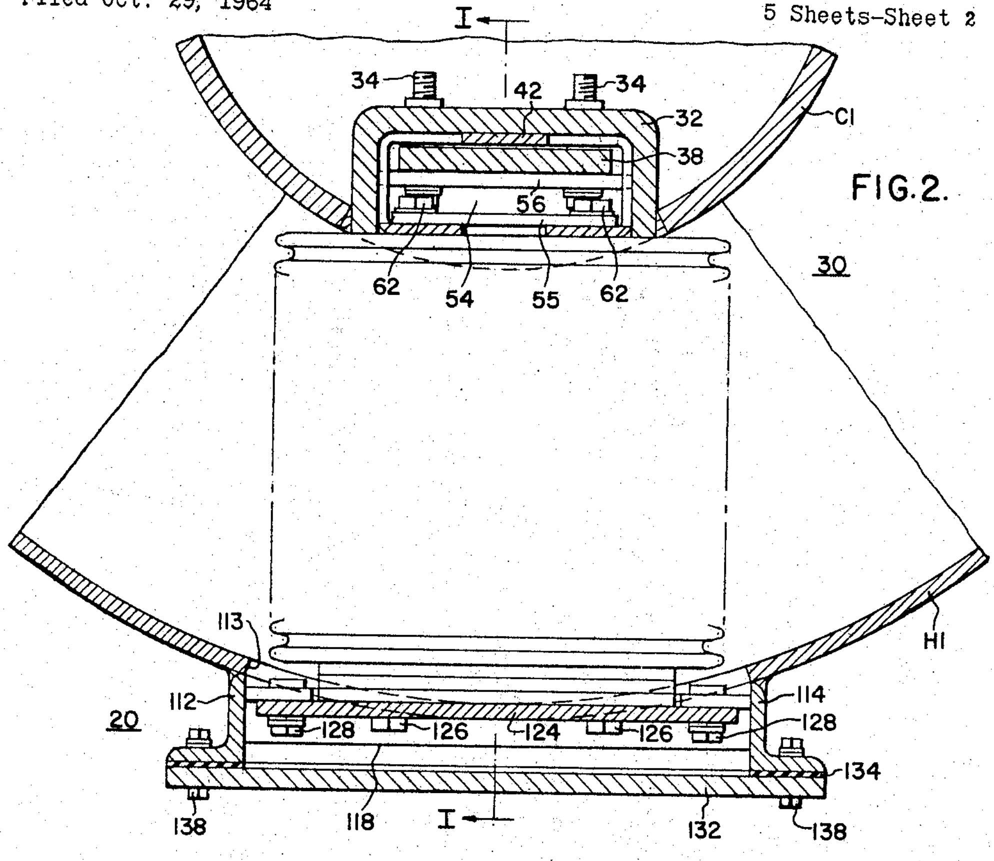
FIG. 2 is a view, partly in end elevation and partly in section, taken along the line II—II of FIG. 1 of the bus structure shown in FIG. 1.
Figure 3:
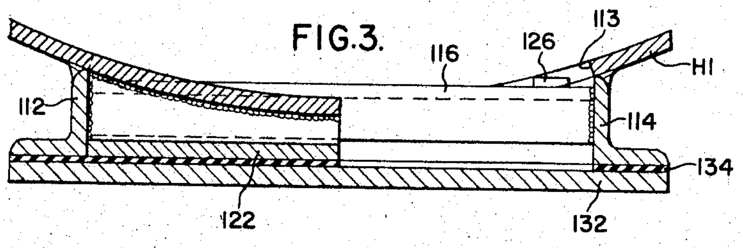
FIG. 3 is a view, partly in end elevation and partly in section, taken along the line III—III in FIG. 1 of a portion of the bus structure shown in FIG. 1.
Figures 13, 16:
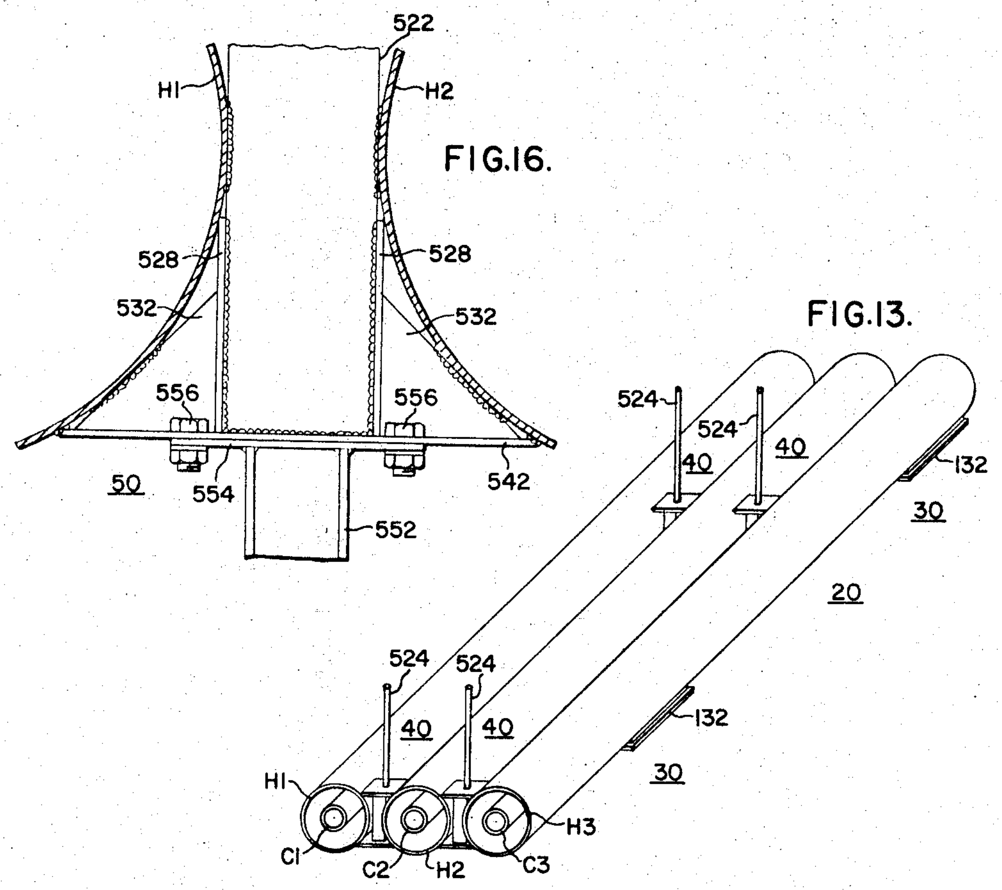
FIG. 13 is an isometric view of an overall three-phase bus structure including three phases identical to that shown in FIGS. 1 through 5.
FIG. 16 is a view, partly in end elevation and partly in section, of a supporting means which is employed with the bus structure shown in FIG. 13 when the bus structure is supported externally from below the bus structure.

Referring now to the drawings and FIGS. 1, 2 and 13 in particular, there is illustrated a three-phase isolated phase bus structure 20 which includes the three laterally spaced phase conductors C1, C2 and C3 and the associated housing or ducts H1, H2 and H3, respectively, for enclosing said phase conductors. The housings H1, H2 and H3 are spaced from the associated phase conductors C1, C2 and C3, respectively, with the space between each phase conductor and the associated housing being substantially filled with a suitable insulating fluid, such as air or other insulating gas. The housings H1, H2 and H3 are preferably formed from a suitable non-magnetic, electrically conducting material, such as aluminum, in order to magnetically shield the magnetic fluxes which result when current flows in the conductors C1, C2 and C3 of the different phases of the bus structure 10, to insure the safety of operating personnel and to prevent the occurrence of a line-to-line or phase-to-phase fault condition during operation of the bus structure 20. The bus structure 20 is particularly adapted to electrically interconnect a first electrical apparatus or source of electric power, such as a generator (not shown), which might be electrically connected to one end of the bus structure 20 and a second electrical apparatus, such as a transformer (not shown), which might be electrically connected to the other end of the bus structure 20 to carry relatively high currents between said apparatus at relatively high potentials or voltages, such as 15 v. or 23 kv. or even higher voltages. The longitudinally extending phase conductors C1, C2 and C3 may have any suitable shape or cross section which provides the required current carrying capacity and in this instance are illustrated as being tubular or hollow cylindrical in shape, as best shown in FIGS. 2 and 5, for the phase of the bus structure 20 which includes the phase conductor C1.

The adjacent ends of the successive housing sections which make up each of the housings H1, H2 and H3 are preferably joined together in a relatively permanent manner, such as by welding, in order to prevent the entrance of dust or other contaminating materials as well as for other important structural reasons which will be discussed hereinafter. In addition, the successive housing sections which make up each of the housings H1, H2 and H3 are preferably electrically connected together to form a continuous electrical path in order to obtain the improved magnetic shielding previously mentioned to thereby reduce the short circuit stresses which would otherwise result.

Figure 5:
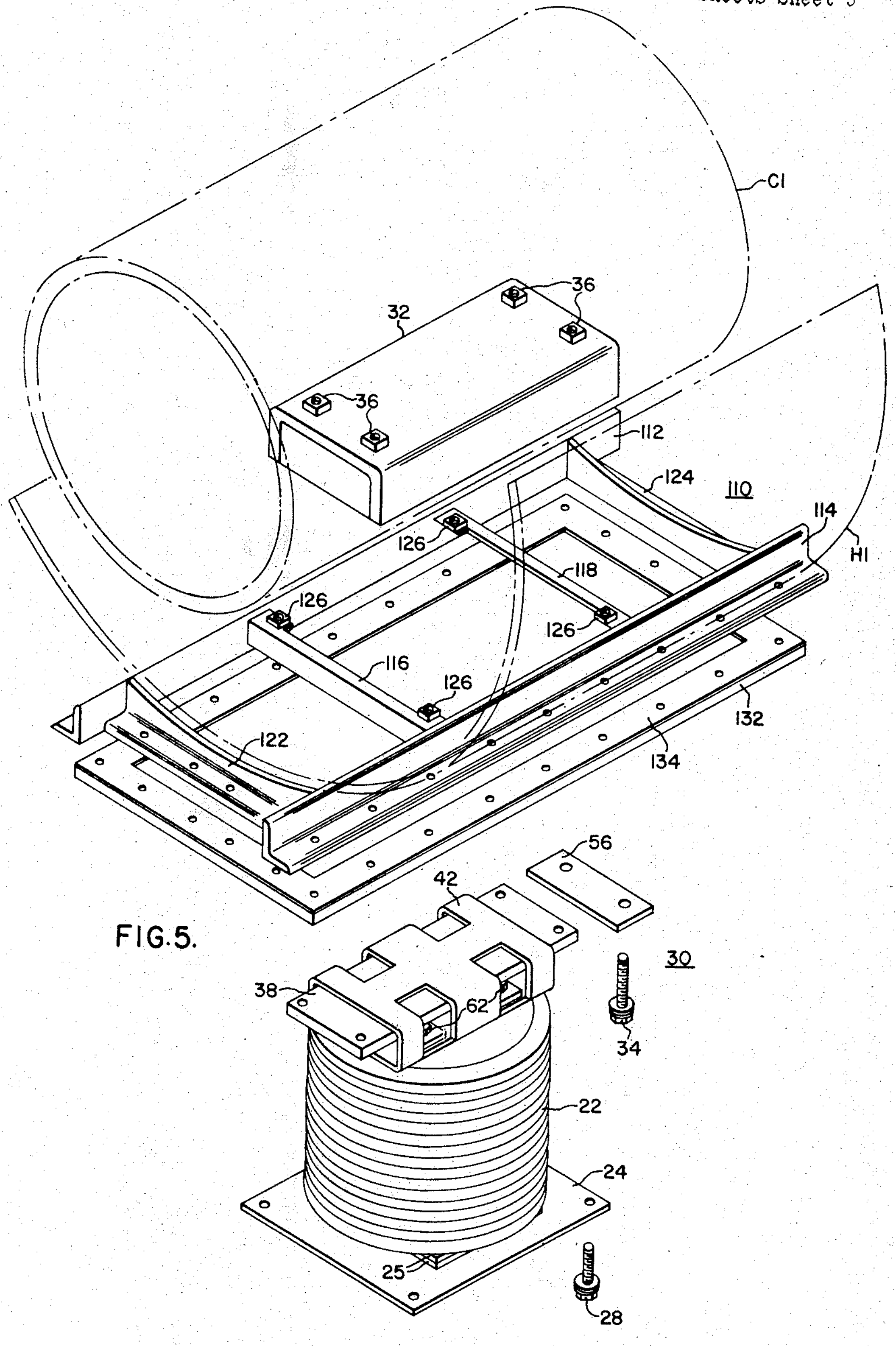
FIG. 5 is an exploded perspective view of the bus structure shown in FIG. 1 with the phase conductor and the associated housing shown in phantom.

In order to support and position the phase conductors C1, C2 and C3 within the associated housings H1, H2 and H3, respectively, the supporting means 30 are disposed between each of the phase conductors C1, C2 and C3 and the associated housings H1, H2 and H3, respectively, and are axially spaced from one another along the associated housings, as best shown in FIG. 13. As best shown in FIGS. 1, 2 and 5, each of the supporting means 30 includes an insulating support or insulator 22 which is formed from any suitable insulating material, such as porcelain. Since the three phases of the bus structure 20 are identical, only the phase which includes the phase conductor C1 and the associated housing H1 will be described in detail.

In order to permit assembly of each of the supporting means 30 with the associated phase conductor C1 and the housing H1, the housing H1 includes a plurality of axially spaced openings 113 which are generally rectangular in configuration with the ends of each opening 113 being arcuate in shape, as best shown in FIG. 5. The size of each opening 113 is sufficient to permit the passage of the associated insulator 22 into the housing H1 and to permit the inspection of the associated insulator 22 in place when an associated cover 132 which normally closes off each opening is either removed or is transparent.

In order to facilitate the releasable securing of the lower end of each insulator 22 to the associated housing H1, the supporting frame 110 is secured to the housing H1 around each of the openings 113, as shown in FIG. 5. The supporting frame 110 includes the angle members 112 and 114 which are secured to the housing H1 at the longitudinally extending sides of the opening 113 and the single members 122 and 124 which are disposed at and secured to the housing H1 at the opposite ends of each opening 113 with the top of each of the angle members 122 and 124 being generally arcuate in shape to match or mate with the configuration of the opposite ends of the opening 113. The angle members 112, 114, 122 and 124 are preferably formed from the same material as the housing H1 and are secured to the housing H1 by any suitable means, such as welding or brazing. The supporting frame 110 also includes the first and second cross members 116 and 118 which extend laterally between the angle members 112 and 114 and which are spaced axially from each other as well as from the adjacent ends of the supporting frame 110 or the opening 113. Each of the cross members or supports 116 and 118 may be generally L-shaped in cross section.

In order to facilitate the securing or assembly of the lower end of each insulator 22 with the associated supporting frame 110, a supporting plate 24 which is generally rectangular in configuration, as illustrated, is secured to the bottom of each insulator 22 by any suitable means, such as the bolts 26 shown in FIGS. 1 and 2 which pass through openings in the plate 24 to engage suitable metallic inserts (not shown) provided at the bottom of each insulator 22. The supporting plate 24 in turn is secured to the cross members 116 and 118 of the supporting frame 110 by any suitable means, such as the machine screws or bolts 28, which pass through suitable openings in said cross members to engage the nuts 126 which are preassembled with and fixedly secured to the cross members 116 and 118, as shown in FIG. 5. It is to be noted that the area of the supporting plate 24 is greater than the area of the opening defined between the cross members 116 and 118 to assist in properly positioning each insulator 22. In order to permit adjustment of the position of the insulator 22 radially or transversely with respect to the associated phase conductor C1, a plurality of spacing members or shims 25 may be disposed between the supporting plate 24 and the lower end of the associated insulator 22, as shown in FIGS. 1, 2 and 5.

In order to facilitate the fastening of the upper end of each insulator 22 with the phase conductor C1, a substantially rectangular opening 33 is provided in the phase conductor C1 at the point where the associated insulator 22 is to be fastened to the phase conductor. In order to form a receptacle to receive the portion of the fastening means which is disposed on and secured to the top of the insulator 22, a channel member 32 is disposed substantially inside the outer periphery of the phase conductor C1 with the lower edges of the channel member 32 being secured to the longitudinally extending sides of the opening 33 by any suitable means, such as welding or brazing. The angle shaped cross members 52 and 54 are also provided at the opposite ends of the opening 33 in the phase conductor C1 and are secured to the phase conductor C1 by any suitable means, such as welding or brazing. The cross members 52 and 54 are also disposed substantially inside the outer periphery of the phase conductor C1 and are secured to the channel member 32 along with the retaining plate 38 which is disposed inside the receptacle formed by said channel member and said cross members by the bolts 34 which pass through suitable aligned openings in the various parts to engage the nuts 36 which are preassembled with and fixedly secured to the top of the channel member 32, as shown in FIG. 5. It is to be noted in FIGS. 1 and 2 that the retaining plate 38 is spaced away from the bight portion of the channel member 32 by the cross members 52 and 54 to form a passage or opening between the channel member 32 and the retaining plate 38. It is also to be noted that the channel member 32, along with the angle members 52 and 54, are preferably formed from the same material as the associated phase conductors C1, C2 and C3 which are preferably formed from a suitable non-magnetic, electrically conducting material, such as aluminum or copper.

In order to facilitate the fastening of the upper end of the insulator 22 to the phase conductor C1, a hollow bracket member 42 which is generally C-shaped in cross section is fixedly secured to the upper end of the insulator 22 by the retaining plates 55 and the bolts 62 which pass through suitable aligned openings in the plates 55 and the bracket member 42 to engage suitable metallic inserts (not shown) provided in the top of the insulator 22, as best shown in FIGS. 1 and 5. The bracket member 42 includes a plurality of slots or recesses to facilitate the assembly of the bracket member 42 with the insulator 22 by the tightening of the bolts 62 with a suitable tool, such as a wrench. It is to be noted that when the insulator 22 is assembled with the associated phase conductor C1, as shown in FIGS. 1 and 2, that the retaining plate 38 which is fixedly secured to the channel member 32 and in turn to the conductor C1 passes through the longitudinally extending opening provided in the bracket 42 and that the top portion of the bracket 32 passes through the opening provided by the space between the bight portion of the channel member 32 and the retaining plate 38.

In order to close off the opening 113 after the associated insulator 22 is assembled with the phase conductor C1 and the housing H1, a removable cover 132 may be secured to the supporting frame 110 by any suitable means, such as the bolts 138, which may pass through suitable aligned openings provided in the cover 132 and the angle members which make up the supporting frame 110. In order to seal the joint between the cover 132 and the supporting frame 110 a suitable gasket 134 may be disposed between the cover 132 and the supporting frame 110, as best shown in FIG. 5.

In the operation of the bus structure 20, the supporting means 30 as described substantially prevents radial or transverse movement of each of the phase conductors with respect to their associated housings or substantially prevents any transverse movement of each phase conductor with respect to its longitudinal dimension. Where desired, the plate member 56 may be disposed between the bracket member 42 and one of the adjacent angle members 52 or 54 and secured thereto by the bolts 34, as best shown in FIG. 1, to also prevent axial movement of the associated phase conductor C1 at the point to which the supporting means 30 is fastened. In a normal application, the plate member 56 is omitted from the supporting means 30 to thereby permit limited axial movement of the associated phase conductor during the thermal expansion and contraction of each phase conductor which result during the operation of the bus structure 20.

Figure 4:
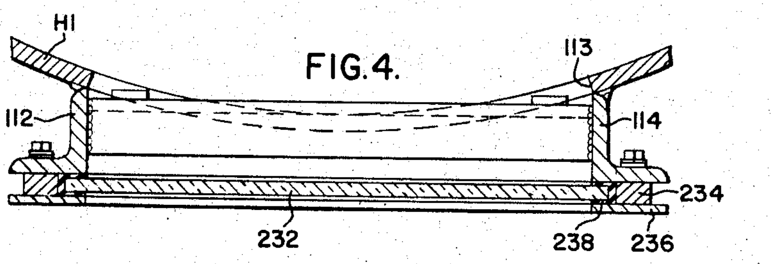
FIG. 4 is a view, partly in end elevation and partly in section, of an alternate construction of a portion of the bus structure shown in FIG. 3.

The assembly of each supporting means 30 with the associated phase conductor will now be described for the phase of the bus structure 20 which includes the phase conductor C1, as best shown in FIG. 5. Assuming that the cover 132 is removed, the insulator 22 is preassembled with the associated supporting plate 24 and the bracket member 42 as shown at the bottom of FIG. 5. The retaining plate 38 is also loosely preassembled inside the bracket member 42 as shown in FIG. 5. It is also assumed that the supporting frame 110 has been preassembled with the housing H1 and that the channel member 32, along with the angle members 52 and 54, have also been preassembled with the phase conductor C1. The preassembled insulator 22 is then inserted through the opening between the cross members 116 and 118 of the supporting frame 110 until the retaining plate 38 is inserted into the receptacle formed by the channel member 32 and the angle members 52 and 54. A suitable tool, such as a socket wrench, may then be inserted through the openings provided between each of the cross members 116 and 118 and the respective ends of the opening 113 provided in the housing H1 to tighten the bolts 34 which engage the nuts 36 preassembled on top of the channel member 32. The bolts or machine screws 28 are then assembled through the supporting plate 24 to engage the nuts 126 provided on the cross members 116 and 118 to complete the assembly of the insulator 22, with the assembled parts being as shown in FIGS. 1 and 2. The cover 132 may be then assembled with the supporting frame 110 by the bolts or screws 138 to complete the assembly of the supporting means 30 with the associated phase conductor C1 and the housing H1. It is to be noted that when the cover 132 is removed from the supporting frame 110, each side of the insulator 22 may be inspected in place through the openings provided between each of the cross members 116 and the respective ends of the opening 113 provided in the housing H1 to thereby facilitate inspection of and access to the insulators 22.

Where desired, an alternate construction may be employed in which the cover included as part of the support means 30 may be transparent, as shown in FIG. 4. As shown in FIG. 4 the cover member 232 is formed from a suitable transparent material, such as glass, and is secured to the supporting frame 110 by a frame member 236 which is secured to the supporting frame 110 by any suitable means, such as bolts, and spaced away from the supporting frame by suitable spacers, as indicated at 234. A resilient gasket may be provided around the edges of the transparent cover 232, as indicated at 238.

Figure 6:
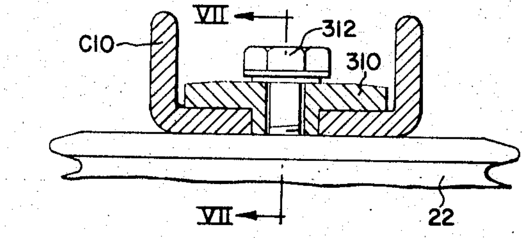
FIG. 6 is a view, partly in end elevation and partly in section, illustrating an alternate construction of a portion of the bus structure shown in FIG. 1.
Figure 7:
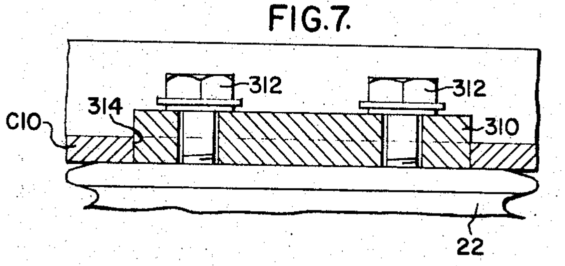
FIG. 7 is a view, partly in side elevation and partly in section, taken along the line VII—VII in FIG. 6 of a portion of bus structure shown in FIG. 6.
Figure 9:
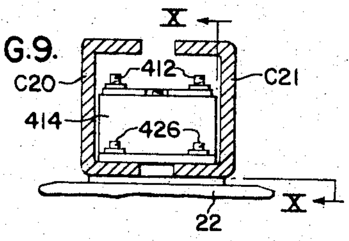
FIG. 9 is a view, partly in end elevation and partly in section, illustrating an alternate construction of a portion of the bus structure shown in FIG. 1.
Figure 8:
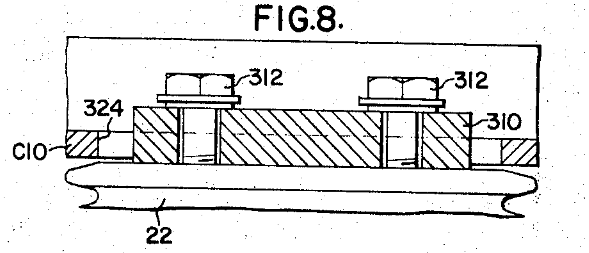
FIG. 8 is a view, partly in side elevation and partly in section, illustrating an alternate construction of a portion of the bus structure shown in FIG. 6.

Referring now to FIGS. 6 through 8 there is illustrated an alternate construction in which each phase conductor is formed as a conducting channel member C10, rather than as a tubular conductor, as previously described. The balance of the bus structure in which the conducting channel member C10 may be employed would be the same as previously described in detail for the bus structure 20. In particular, the conducting channel member C10 is secured or fastened to each of the associated axially spaced insulators 22 by a generally T-shaped retaining member 310 which extends longitudinally of the associated channel member C10 with the lower portion of the retaining member 310 extending through a slot cut through the web or bight portion of the conducting channel member C10, as shown in FIG. 6. The retaining member 310 is fixedly secured to the upper end of the associated insulator 22 by the bolts 312 which pass through suitable openings in the retaining member 310 to engage metallic inserts (not shown) provided in the top of the insulator 22. In order to prevent both radial movement as well as substantially prevent axial movement of the conducting channel member C10 at the point to which the insulator 22 is fastened, the ends of the retaining member 310 bear against the longitudinally extending slot cut through the web portion of the conducting channel member C10, as shown in FIG. 7. In order to permit limited axial movement of the conducting channel member C10 with respect to the insulator 22, the length of the slots or recesses provided in the conducting channel member C10 may exceed the length of the retaining member 310, as indicated at 324, in FIG. 8 to substantially prevent radial or transverse movement of the conducting channel member C10 with respect to the associated housing but to permit limited axial movement during thermal expansion or contraction of the conducting member C10. It is to be noted that the retaining member 310 should be formed from an electrically conducting material which is preferably the same conducting material as the associated conducting channel member C10 which are preferably formed from a non-magnetic, electrically conducting material, such as aluminum or copper.

In the assembly of each insulator 22 with the conducting channel member C10, each insulator 22 is passed into the associated housing through the opening provided between the cross members 116 and 118 of the associated supporting frame 110. Member 310 is loosely preassembled on top of the insulator 22. The conducting channel member C10 is then positioned in assembled relationship with the associated retaining member 310 and the bolts 312, as shown in FIG. 6, and the bolts 312 are then tightened with a suitable tool, such as a socket wrench, which is inserted through the openings between the cross members 116 and 118 and the adjacent ends of the supporting frame 110. The assembly of each insulator 22 with the conducting channel member C10 is then completed similarly to the assembly of each insulator 22 with the conductor C1 previously described by securing a supporting plate on the bottom of each insulator 22 with the supporting frame 110 and then finally assembling the cover 132 on supporting frame 110.

Figure 10:
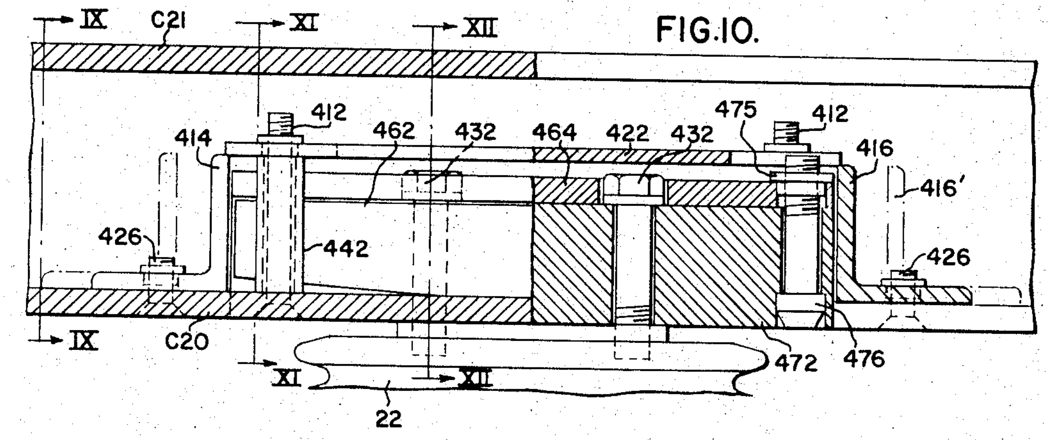
FIG. 10 is a view, partly in side elevation and partly in section taken along the line X—X in FIG. 9 of a portion of bus structure shown in FIG. 9.
Figure 11:
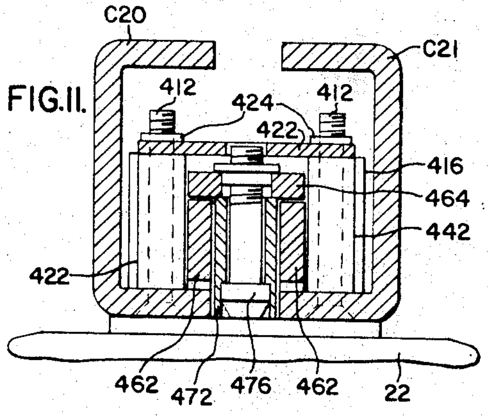
FIG. 11 is a view, partly in end elevation and partly in section, taken along the line XI—XI in FIG. 10 of a portion of bus structure shown in FIGS. 9 and 10.
Figure 12:
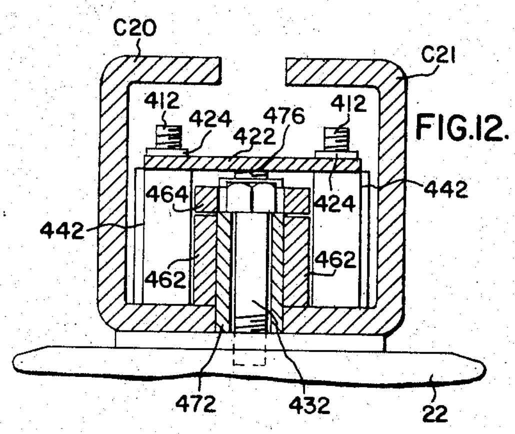
FIG. 12 is a view, partly in end elevation and partly in section, taken along the line XII—XII in FIG. 10 of a portion of bus structure shown in FIGS. 9 through 11.

Referring now to FIGS. 9 through 12, there is illustrated an alternate construction in which each phase conductor is formed from a pair of conducting channel members C20 and C21 which are also supported by a plurality of axially spaced insulators 22 in a bus structure which is the same as the bus structure 20 previously described except as to the manner in which the conducting channel members C20 and C21 are fastened to the associated insulators 22. In order to provide a receptacle between the channel members C20 and C21 to receive the portion of the fastening means which is secured to the top of the insulator 22, the retaining plate member 422 is disposed between the channel members C20 and C21 and is secured to said channel members by any suitable means, such as the bolts 412, which pass through the lower portion of each of said channel members and through the associated spacing sleeves or pipe members 442 through suitable aligned openings in the retaining plate 422 to engage the nuts 424 which are preassembled with and fixedly secured to the plate 422. In order to complete the receptacle just indicated, the angle members 414 and 416 are disposed at the opposite ends of the retaining plate 422 and secured to the associated channel members C20 and C21 by suitable means, such as the bolts 426, as best shown in FIG. 10. The portion of the fastening means which is secured to the top of the insulator 22 includes an upwardly extending block or plate 472 having a width which is less than the lateral spacing between the conducting channel members C20 and C21 as shown in FIG. 11 and having a length less than the longitudinal dimension of the space provided within the receptacle previously described. The block member 472 is secured to the top of the insulator 22 by any suitable means, such as the bolts 432, which pass through suitable openings in the block 472 to engage suitable metallic inserts (not shown) provided in the top of the insulator 22, as best shown in FIG. 10. It is to be noted that the heads of the bolts 432 pass through openings provided in the plate 464 without engaging the plate 464 which is disposed between the block 472 and the retaining plate 422 previously described. The spacer plates 462 are disposed at the opposite sides of the block 472 between the block 472 and the adjacent spacer sleeves 442 which are disposed between the channel members C20 and C21 and the plate 422, as best shown in FIGS. 11 and 12. When the insulator 22 is assembled with the channel conductors C20 and C21, the plate 464 is fixedly secured to the block 472 by the bolts 476 which pass through suitable openings in the end portions of the block 472 to engage the associated nuts 475 which are preassembled with and fixedly secured to the top of the plate 464.

In the assembly of the insulator 22 with the channel conductors C20 and C21, it is assumed that the plate 422 is preassembled with and secured to the associated channel conductors C20 and C21 along with the angle members 414 and 416. It is also assumed that the plate 464 is preassembled inside the receptacle previously described with the spacers 462 supporting the plate 464 prior to the assembly of the insulator 22 with the conductors C20 and C21. The insulator 22 is inserted through the opening provided in the associated housing, as previously described, with the block 472 passing between the channel conductors C20 and C21 until the assembled parts are as shown in FIGS. 11 and 12. A suitable tool, such as a socket wrench, may then be employed to tighten the bolts 476 at the opposite ends of the block 472 until the bolts 476 engage the associated nuts 475, as best shown in FIG. 10.

In applications where the channel conductors C20 and C21 are to be substantially prevented from moving both in a radial direction and in an axial direction with respect to the associated housing, the angle member 416 is disposed as shown in FIG. 10 directly adjacent to the end of the block 472. In applications, where the channel conductors C20 and C21 are to be permitted limited axial movement, the angle member 416 may be positioned in spaced relationship with respect to the adjacent end of the block member 472, as indicated in phantom at 416' in FIG. 10. It is to be noted that the vertical dimension of the spacer members 46 and 462 may be tapered to a decreasing value at the ends of said spacer members to permit a limited deflection of the associated channel conductors C20 and C21 with respect to the supporting insulators 22.

In the assembly of the insulators 22 with the conducting channel members C20 and C21, the plate 422 and the angle members 414 and 416 are preassembled with and secured to the channel members C20 and C21 with the bolts 426 and 412 along with the spacer members 442 being positioned as shown in FIG. 10. The spacer members 462 and the plate 464 are then preassembled within the receptacle formed by the plate 422 and the angle members 414 and 416, as shown in FIGS. 11 and 12. Each insulator 22 is then preassembled with the block member 472 which is secured to the insulator 22 by the bolts 432 prior to passing the insulator 22 into the associated housing through the opening formed between the cross members 116 and 118 of the associated supporting frame 110. After the insulator 22 is assembled in position with the block 472 between the spacer members 462 as shown in FIGS. 10 and 12, the bolts 476 are assembled with the block member 472 and pass through the corresponding openings in said block member to engage the nuts 475 which are preassembled and fixedly secured to the top of the retaining plate 464, as shown in FIG. 10. A suitable tool, such as a socket wrench may then be inserted through the openings provided between the cross members 116 and 118 and the adjacent ends of the supporting frame 110 to tighten the bolts 476 and to secure the retaining plate 464 to the top of the insulator 22 through the block member 472. The assembly of each insulator 22 with the channel members C20 and C21 is then completed by securing a supporting plate mounted at the bottom of each insulator 22 to the cross members 116 and 118 and then assembling the cover 132 with the supporting frame 110 as previously described in connection with the conducting member C1.

It is important to note that in the different embodiments of the invention described thus far that the phase conductors of each phase of the bus structure are supported within the associated housings by a plurality of axially spaced insulating supports or insulators which are supported solely by the associated housing without the supporting means for each phase conductor extending through the associated housing to an external transverse supporting structure, as in prior bus structures of the same general type. Since the insulators are supported solely by the associated housing in the disclosed bus structures, the forces supporting each phase conductor are transmitted or pass entirely through the associated housing and the external supports for the housings themselves can be located independently of the location of the spaced insulators which are disposed inside and supported solely by each housing, as shown in FIG. 13. In other words, as shown in FIG. 13, the housings H1, H2 and H3 are supported by a plurality of axially spaced, external supporting means 40 which are disposed between the respective pairs of housings and secured thereto as will be described hereinafter.

Figure 14:
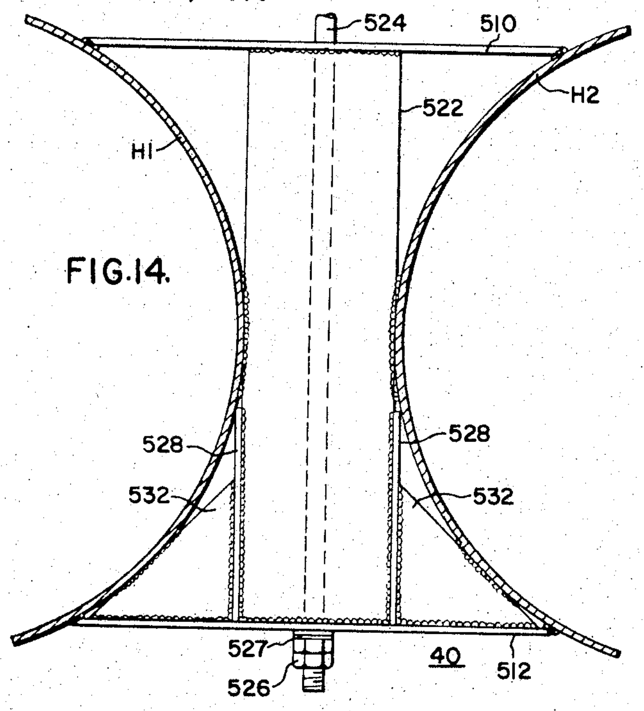
FIG. 14 is a view, partly in end elevation and partly in section, of a supporting means included in the bus structure shown in FIG. 13.
Figure 15:
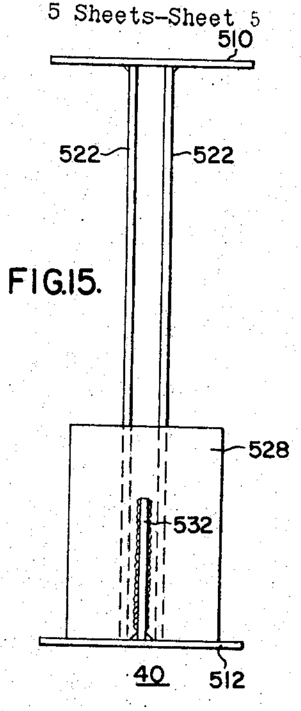
FIG. 15 is a view in side elevation of the supporting means shown in FIG. 14.

In particular, where the housings H1, H2 and H3 are to be supported by over-hanging supporting members, such as the hangers 524, each of the supporting means 40 includes the support plates 510 and 512 which are each disposed in a substantially horizontal plane and spaced from one another with the ends of the plates 510 and 512 being secured to the adjacent pair of housings H1 and H2 shown in FIGS. 14 and 15 by any suitable means, such as welding. The supporting means 40 also includes a pair of vertical supporting plates 522 which are spaced from one another and which extend vertically between the horizontal supporting plates 510 and 512, with the middle portions of the plates 522 being secured to the associated housings H1 and H2 by any suitable means, such as welding, and with the ends of the plates 522 being also secured to the horizontal plates 510 and 512 by any suitable means, such as welding. The supporting means 40 also includes the vertical supporting plates 528 which are spaced from one another and disposed at substantially a right angle with respect to the associated vertical plates 522, as shown in FIGS. 14 and 15, with the plates 528 being secured to the plates 522 by any suitable means, such as welding. Finally, the supporting means 40 includes a pair of substantially triangular bracing or supporting members 532 which are disposed in the respective spaces between the housings H1 and H2 and the adjacent plates 528 and 512, as best shown in FIG. 14. The bracing members 532 are secured to the adjacent housings as well as to the adjacent plates 528 and 512 by any suitable means, such as welding. It is to be noted that the framework formed by the supporting means 40 secures the adjacent housing together and also functions as a supporting bracket to receive the hanger member 524 which passes through the supporting members through an opening in the upper plate 510, the space between the plates 522 and an opening in the lower plate 512, with the lower end of the hanger member 524 being threaded to receive the lock nuts 527 and the nuts 526, as shown in FIGS. 14 and 15.

Referring now to FIG. 16, a supporting means 50 is illustrated which may be employed where the housings H1, H2 and H3 are to be supported by columns or a support from beneath the housings with the supporting means 50 being substituted for the supporting means 40 where required in a particular application. In general, the supporting means 50 is similar to the supporting means 40 except that the lower portion of the supporting means is modified as shown in FIG. 16 to receive a supporting column or beam 552 which has a suitable supporting plate 554 secured to the top thereof by any suitable means, such as welding. The supporting plate 554 is then secured to the lower plate 542 of the supporting means 50 by any suitable means, such as the bolts 556, which pass through aligned openings in the plates 542 and 554. Otherwise the supporting means 50 is the same as the supporting means 40 previously described in detail.

It is important to note that in a bus structure as disclosed that each of the housings H1, H2 and H3 functions as a longitudinally extending supporting beam which supports the phase conductors and the associated insulators within each housing as well as an enclosing member. As previously mentioned, the successive housing sections which make up each of the housings H1, H2 and H3 are electrically continuous for magnetic shielding purposes and are secured together in a relatively permanent manner, such as by welding, so that the housings H1, H2 and H3 are each in effect a single cylinder which is substantially continuous over long spans. For example, it has been found that, if each of the housings H1, H2 and H3 are formed from one-quarter inch aluminum plate in lengths of approximately ten feet which are welded together, each of the housings H1, H2 and H3 can structurally support a maximum span of approximately 100 feet with a limited deflection at the middle of the span. In other words, the material from which each of the housings H1, H2 and H3 is formed should preferably have sufficient bending strength to support both itself and the enclosed phase conductor and insulators between the spaced external supports, such as the supporting means 40, and may be sufficiently resilient to permit a limited deflection between the spaced external supports without a conventional supporting framework that extends completely transversely across all of the housings H1, H2 and H3 or extends longitudinally of said housings as in a conventional arrangement. Since the housings H1, H2 and H3 are also formed from an electrically conducting material with the successive housing sections of each housing being electrically continuous, transverse short circuit forces on the supporting insulators are substantially eliminated and there are substantially no magnetic forces between the laterally spaced phase conductors or adjacent housings.

It is to be understood that the teachings of this invention may be applied to segregated phase bus or to single phase bus structures including a pair of conductors and the associated housings rather than in a three phase bus structure as disclosed. It is also to be understood that other types of conventional insulating supports may be provided in a particular application in which the insulating supports are supported solely by the associated housing.

The bus structure embodying the teachings of this invention has several advantages. For example, the supporting means provided for the phase conductor in each of the embodiments disclosed permits the convenient assembly of the supporting insulators with the associated phase conductors through convenient openings in the associated housing during the original manufacture of the bus structure and also permits convenient inspection or replacement of the insulators after the bus structure is placed in operation. In addition, the supporting insulators as disclosed all lie in substantially the same longitudinally extending plane so that the number of insulating paths to the grounded parts of the bus structure are reduced and the corresponding possibility of an insulation failure from one of the phase conductors, which are normally at line potential, to ground are also reduced. Another advantage of the bus structure as disclosed is the external supports for the housings may be located independently of the location of the supporting insulators within the housing and the individual housings are effectively self-supporting without requiring an elaborate transverse or longitudinally extending support framework as in prior constructions. A further advantage of a bus structure as disclosed is that it lends itself readily to those applications in which it is desirable that the successive housing sections which make up each housing be joined together in a relatively permanent manner, such as by welding, without the necessity for telescoping or removable housing sections, as in prior constructions. The embodiment of the applicant's invention in which a tubular phase conductor is employed, such as the phase conductor C1, has the additional advantage that the fastening means employed between each of the supporting insulators and the associated phase conductor is disposed substantially inside the outer periphery of the phase conductor to thereby reduce the possibility of an insulating flashover failure between the phase conductor and the grounded portions of the bus structure due to the possible concentration of potential stress at the sharp edges of the fastening means which might be employed.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An isolated phase bus structure comprising a longitudinally extending bus conductor, a generally tubular housing spaced from and enclosing the bus conductor, said housing including a plurality of sections welded together end to end, each section of said housing having a plurality of axially spaced openings each with a removable cover secured to said housing to close off each opening, a plurality of insulating members for supporting said conductor, each of said insulating members being releasably secured at one end to said conductor and releasably secured at the other end to said housing at one of said openings, each insulating member being disposed to pass through the associated opening generally transverse with respect to the bus conductor when the cover of the opening is removed.

2. An isolated phase bus structure comprising a longitudinally extending bus conductor, a generally tubular housing spaced from and enclosing the bus conductor, said housing including a plurality of sections welded together end to end, each section of said housing having a plurality of axially spaced openings each with a removable cover secured to said housing to close off each opening, a plurality of insulating members for supporting said conductor, each of said insulating membres being releasably secured at one end to said conductor and releasably secured at the other end to said housing at one of said openings, each insulating member being disposed to pass through the associated opening when the cover of the opening is removed, all of said insulating members lying in substantially the same longitudinally extending plane.

3. An isolated phase bus structure comprising an elongated bus conductor, a generally tubular housing spaced from and enclosing the conductor, said housing including a plurality of axially spaced openings, supporting frame means secured to and supported only by said housing substantially around each opening, a plurality of axially spaced insulating members disposed between said conductor and the respective frame means for supporting said conductor, each insulating member being releasably secured at one end to said conductor and releasably secured at the other end to one of said frame means, and a cover secured to each frame means to close off the associated opening.

4. An isolated phase bus structure comprising an elongated bus conductor, a generally tubular housing spaced from and enclosing the conductor, said housing including a plurality of axially spaced openings, supporting frame means secured to and supported only by said housing substantially around each opening, a plurality of axially spaced insulating members disposed between said conductor and the respective frame means for supporting said conductor, each insulating member being releasably secured at one end to said conductor and releasably secured at the other end to one of said frame means, and a cover secured to each frame means to close off the associated opening, at least a portion of each cover being transparent.

5. An isolated phase bus structure comprising an elongated bus conductor, a generally tubular housing spaced from and enclosing the conductor, said housing including a plurality of axially spaced, aligned openings, supporting frame means secured to and supported solely by said housing substantially around and across each opening intermediate the ends thereof, a plurality of axially spaced insulating members disposed between said conductor and the respective frame means for supporting said conductor, each insulating member being releasably secured at one end to said conductor and releasably secured at the other end to one of said frame means, each insulating member being supported only by said housing and frame means, and a cover secured to each frame means to close off the associated opening.

6. An isolated phase bus structure comprising an elongated bus conductor, a generally tubular housing spaced from and enclosing the conductor, said housing including a plurality of axially spaced, aligned openings, supporting frame means secured to and supported only by said housing substantially around and across each opening intermediate the ends thereof, and a plurality of axially spaced insulating members disposed between said conductor and the respective frame means for supporting said conductor, each insulating member being releasably secured at one end to said conductor and releasably secured at the other end to one of said frame means, a cover secured to each frame means to close off the associated opening, each insulating member being supported only by said housing and frame means, the size of each of said openings being sufficient to permit the passage of an insulating member therethrough when the associated cover is removed.

7. An isolated phase bus structure comprising an elongated bus conductor, a generally tubular housing spaced from and enclosing the conductor, said housing including a plurality of axially spaced, aligned openings, supporting frame means secured to and supported only by said housing substantially around and across each opening intermediate the ends thereof, and a plurality of axially spaced insulating members disposed between said conductor and the respective frame means for supporting said conductor, each insulating member being releasably secured at one end to said conductor and releasably secured at the other end to one of said frame means, each insulating member being supported only by said housing and frame means, a cover secured to each frame means to close off the associated opening, and means secured to said housing for supporting said housing, the latter means being located independently of the location of said insulating members.

References Cited

UNITED STATES PATENTS

| | | | |
|---|---|---|---|
| 1,970,125 | 8/1934 | Burnham. | |
| 2,181,664 | 11/1939 | Melzer | 174—99 X |
| 2,293,310 | 8/1942 | Rudd | 174—99 X |
| 2,396,131 | 3/1946 | Scott | 174—99 |
| 2,763,710 | 9/1956 | West et al. | 174—99 |
| 2,944,101 | 7/1960 | Albright | 174—99 |
| 2,970,185 | 1/1961 | Swerdlow et al. | 174—99 |
| 3,015,743 | 1/1962 | Skeats | 174—99 X |
| 3,061,665 | 10/1962 | Rugg et al. | 174—99 X |
| 3,221,097 | 11/1965 | Cognet et al. | 174—99 |

LARAMIE E. ASKIN, *Primary Examiner.*

J. F. RUGGIERO, *Assistant Examiner.*